(12) United States Patent
Chen et al.

(10) Patent No.: US 8,254,788 B2
(45) Date of Patent: Aug. 28, 2012

(54) HIGH SPEED IN-SERVICE OPTICAL NETWORK TESTING

(75) Inventors: David Zhi Chen, Richardson, TX (US); Mark Anthony Ali, Cockeysville, MD (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 330 days.

(21) Appl. No.: 12/636,927

(22) Filed: Dec. 14, 2009

(65) Prior Publication Data

US 2011/0142439 A1 Jun. 16, 2011

(51) Int. Cl.
*H04B 10/18* (2006.01)
*H04B 10/12* (2006.01)

(52) U.S. Cl. .......................... 398/148; 398/29
(58) Field of Classification Search .............. 398/27–28, 398/147–148, 29
See application file for complete search history.

(56) References Cited

U.S. PATENT DOCUMENTS

| | | | |
|---|---|---|---|
| 2002/0126351 A1* | 9/2002 | Chung et al. | 359/124 |
| 2010/0115300 A1* | 5/2010 | Wu et al. | 713/300 |
| 2010/0239245 A1* | 9/2010 | Yao | 398/27 |
| 2011/0206204 A1* | 8/2011 | Sychev | 380/256 |

* cited by examiner

*Primary Examiner* — Leslie Pascal

(57) ABSTRACT

A method may include generating a signal at an initiating device. A channel in an optical path may be identified, with the optical path including at least two spans. Simulated polarization mode dispersion (PMD) is injected into the signal to generate a test signal. The test signal is transmitted on the channel and received at a destination device. PMD effects in the test signal are compensated, and a measurement of PMD for the test signal is determined based on the compensation, the PMD for the test signal including PMD for the channel and the injected PMD. A measurement of the PMD for the channel is determined based on the PMD for the test signal and the injected PMD.

20 Claims, 11 Drawing Sheets

HIGH SPEED IN-SERVICE OPTICAL NETWORK TESTING

BACKGROUND INFORMATION

Routing video, data and voice traffic at high bit rates via Ultra Long Haul (ULH) or Metro optical networks is becoming increasingly common in the modern communications systems. Accordingly, proper testing of such optical networks is performed to ensure network performance, quality of services, and reliability. However, the fiber optic cables that carry optical signals within the optical networks may often contain asymmetries introduced during manufacture or installation, or resulting from environmental conditions. These asymmetries result in the optical properties of the fiber not being the same in all directions. These differences may render the fiber birefringent along the fiber cables, where the material provides two different indices of refraction. This fiber birefringence causes polarization mode dispersion (PMD), which may impair the transmission of telecommunication signals over the optical fibers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to testing and compensating for polarization mode dispersion (PMD) and residual chromatic dispersion (RCD) effects corresponding to an entire optical path that potentially spans multiple network devices. "RCD" refers to CD effects present on a multi-span link after initial CD compensation has already been performed on each span in the link. The optical path may pass through a number of amplifiers (e.g., Raman amplifiers (discrete and distributed), erbium doped fiber amplifiers (EDFAs), hybrid amplifiers (e.g., hybrid EDFA/Raman amplifiers)), and a number of nodes, such as nodes that include optical add-drop multiplexers, demultiplexers, etc.

In one exemplary implementation, a source signal may be injected into a selected channel in the optical path. The source signal may be transmitted at selected bit rates corresponding to potentially provided data rates along the selected channel. As the test signal passes through a number of amplifiers and filters, PMD and RCD effects may modify the test signal. A test-receiving device may receive the variable bit-rate signal, may compensate for PMD and RCD effects, and compensate for these effects. The receiving device may further report the results of the PMD and RCD determinations to the initiating test device or other devices. In an exemplary implementation, the portion of the test signal that passed through all the nodes may be used to determine and potentially compensate for the overall, end-to-end PMD and/or RCD characteristics of the optical path. Although the following description refers primarily to compensating and measuring PMD and RCD effects, other network effects may be similarly handled, such as non-residual CD effects, etc.

Figure 1:
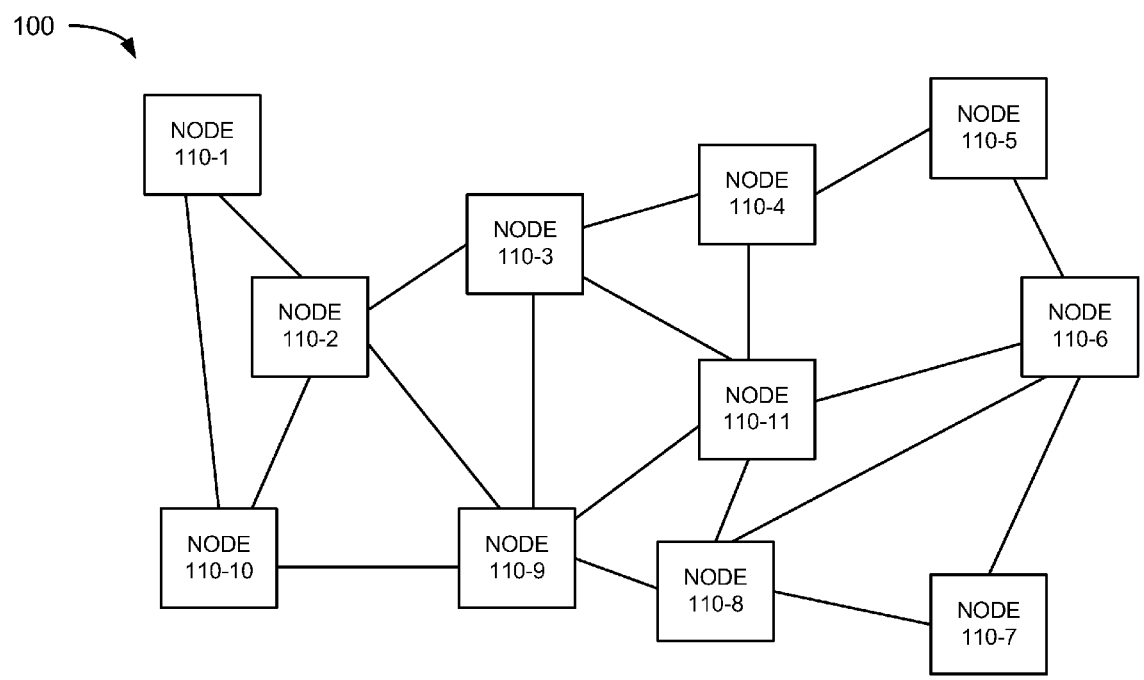
FIG. 1 illustrates an exemplary network in which systems and methods described herein may be implemented.

FIG. 1 is a block diagram of an exemplary network 100 in which systems and methods described herein may be implemented. Network 100 may represent a mesh network that include a number of nodes 110-1 through 110-11, referred to collectively as nodes 110 and individually as node 110 or node 110-N (where N represents any value). In mesh network 100, each line connecting one of nodes 110 to another of nodes 110 may represent one or more optical fibers interconnecting the nodes 110. Each optical fiber may also include a large number of individual channels upon which data may be transmitted. For example, data in network 100 may be transmitted using wavelength division multiplexing (WDM), in which multiple optical carrier signals are transmitted on a single optical fiber by using different wavelengths of laser light or electromagnetic radiation to carry different channels. In some implementations, data in network 100 may be transmitted using dense wavelength division multiplexing (DWDM). DWDM uses the C band (i.e., frequencies between 1530 and 1565 nanometers (nm)) and/or L band (i.e., wavelengths between 1565 and 1625 nm). The term "light" as used herein should be construed to include any type of electromagnetic radiation.

Figure 3:
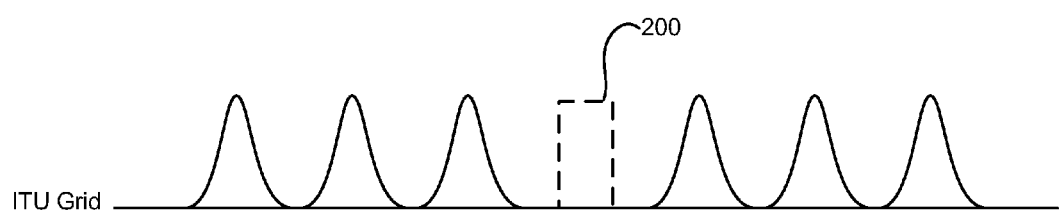
FIG. 3 is a graphical depiction of an available channel among a number of dense wavelength division multiplexing channels.

In an exemplary implementation, each node 110 may represent an optical add-drop multiplexer (OADM), such as a reconfigurable optical add-drop multiplexer (ROADM) that can switch traffic on the optical domain, without the need to convert the optical signals from/to electrical signals. For example, each node 110, also referred to herein as ROADM 110, may include a ROADM that can remotely switch traffic that was transmitted using WDM or DWDM at the wavelength layer. Each ROADM may include one or more tunable filters (e.g., a WDM filter) that receive a stream of optical signals having different wavelengths that can direct a selected channel (e.g., a particular wavelength in the range of the optical system being implemented (e.g., C-band or L-band)). By using a ROADM, individual or multiple optical channels having different wavelengths may be added and/or dropped from a transport optical fiber without requiring node 110 to convert the optical signals on the WDM channels to non-optical (i.e., electrical) signals and then back to optical signals. For example, FIG. 3 is a graphical depiction of an available channel 200 among a number of DWDM channels.

As described above, network 100 may include a number of optical amplifiers (not shown) configured to amplify or boost optical signals at points within network 100. Optical amplifiers may include Raman, DFA, EDFA, or hybrid amplifiers.

Figure 2:
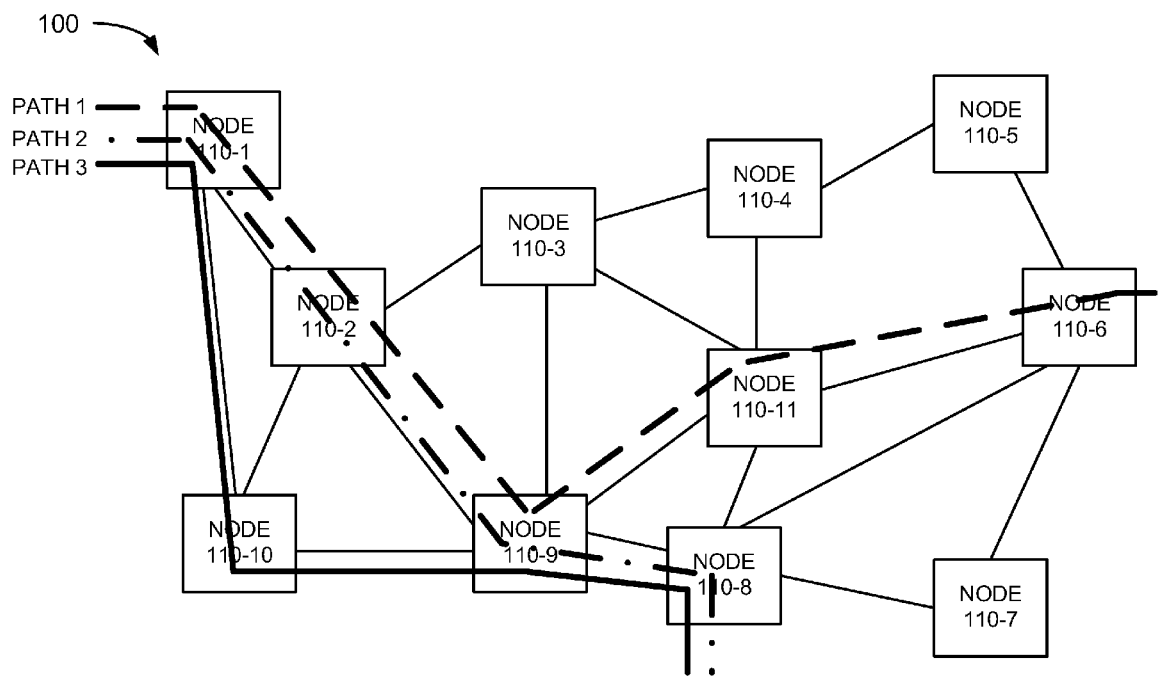
FIG. 2 illustrates exemplary paths in the network of FIG. 1.

As illustrated in FIG. 1, each node 110 in network 100 may be connected to several other nodes 110 to form a mesh network that allows traffic from a source to a destination to be routed in several different ways. For example, FIG. 2 illustrates exemplary paths through network 100. Referring to FIG. 2, traffic may be transmitted from node 110-1 to node 110-8 via path 2 (shown by the dotted and dashed line), which includes nodes 110-1, 110-2, 110-9 and 110-8. Alternatively, traffic may be transmitted from node 110-1 to node 110-8 via path 3 (shown by the heavy solid line), which includes nodes 110-1, 110-10, 110-9 and 110-8. Network 100 may route data from node 110-1 to node 110-8 using either of paths 2 or 3. Similarly, network 100 may include multiple paths connecting other ones of nodes 110 and may use a particular path based on network conditions. For example, data may be transmitted from node 110-1 to node 110-6 via path 1 (shown with the dashed line). Having multiple paths interconnecting nodes 110 allows traffic to be routed on network 100 to avoid, for example, congested portions of network 100 and/or failed portions of network 100.

The exemplary network configuration illustrated in FIG. 1 and exemplary paths illustrated in FIG. 2 are provided for simplicity. A typical network 100 may include more or fewer nodes 110 than illustrated in FIG. 1, more paths than illustrated in FIG. 2, or a different configuration of nodes and paths than illustrated. Network 100 may also include additional elements, such as amplifiers, switches, gateways, routers, monitoring systems, etc., that aid in routing traffic toward its intended destination.

As described above, each of nodes 110 may represent a ROADM used to switch signals at the wavelength layer. That is, each ROADM 110 may include a multiplexing device that allows the ROADM to add one or more channels on a fiber, as well as a demultiplexing device that allows the ROADM to drop one or more channels on a fiber. Each ROADM 110 may also include one or more tunable filters that has its own band-pass characteristic. For example, filters located in ROADMs 110 may be individually tuned based on, for example, temperature conditions, and each filter could be offset by a different amount. For example, a filter at a first ROADM 110 in a path (e.g., ROADM 110-1) may be offset to the left of the center frequency by 1-2 gigahertz (GHz), while a filter at another ROADM 110 in the path (e.g., ROADM 110-10) may be offset to the right by 1-2 GHz. In additional, ROADMs 110 may include amplifier and/or splitting components that may introduce polarization dependent gain (PDG) or polarization dependent loss (PDL) into the optical signal.

Materials, devices, and various environmental factors, such as temperature, fiber movement, and mechanical stress on the fibers may affect transmission of an optical signal through network 100. For example, a quality of a link of optical fiber (e.g., a link of fiber between nodes 110-1 and 110-2 in path 2) may affect a given path's ability to support transmission of signals without unacceptable error rates. For example, optical fibers that carry optical signals may contain asymmetries. These asymmetries result in the optical properties of the fiber not being the same in all directions, resulting in birefringence. Birefringence refers to changes in refractive index within a fiber that cause varying transmission speeds of the two orthogonal polarization modes that together make up the optical signal.

This fiber birefringence may cause PMD, which may impair the transmission of signals over telecommunication optical fiber at line rates of 10 gigabits per second (Gbps) or above over long distances e.g., ultra long haul (ULH) spans. Similar to PMD, fiber and related device characteristics and environmental factors may also cause chromatic dispersion (CD) of a light signal as it travels through a fiber. CD refers to a broadening of an input signal. The broadening of the signal may cause the signal to diverge or disperse and bleed into neighboring wavelength channels.

In traditional, point-to-point optical fiber networks, measurement and compensation of PMD typically occurs on or before deployment of the dedicated network. However, with the advent of optical mesh networks, a single path through a network may change in a dynamic manner with the addition/removal of nodes, optical amplifiers, etc. Accordingly, testing of an optical mesh network for each possible path through the network may be unworkable, if not impossible, at the time of network creation. Conventional testing in such circumstances would typically involve taking all network devices (e.g., ROADMs) in a path out of service and testing each link in the path for PMD across a range of wavelengths. Such testing environments do not allow for in-service testing of any portion of the optical network.

In accordance with an exemplary implementation, test devices for in-service testing may be configured to provide testing for an optical path in network 100 without taking any of nodes 110 out of service. In addition, test devices consistent with implementations described herein may enable determination of mean PMD that includes higher-order PMD effects for a selected channel in a short period of time.

Figure 4:
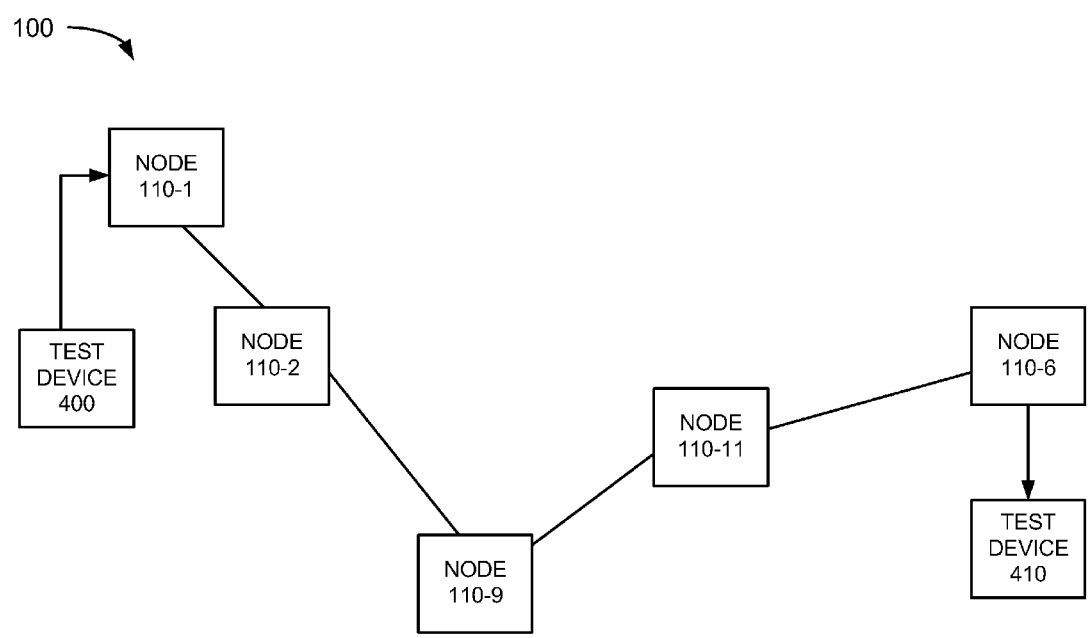
FIG. 4 illustrates an exemplary test scenario to test one of the paths of FIG. 2.

For example, FIG. 4 illustrates an exemplary scenario in network 100 in which a test-transmitting device 400 and a test-receiving device 410 may be used to test an optical path, such as path 1 illustrated in FIG. 2. Referring to FIG. 4, test device 400 may represent a transmitter device used to generate and transmit a test signal on a selected channel at node 110-1 (e.g., a channel not currently being used for normal traffic). The test signal may be provided to node 110-1 and transmitted from node 110-1 to node 110-6 via nodes 110-2, 110-9 and 110-11. At the end of the path, test device 410 may represent a receiver device used to receive optical data, and calculate or determine the mean PMD of the selected channel in the optical path, as described in more detail below.

Figure 5A:
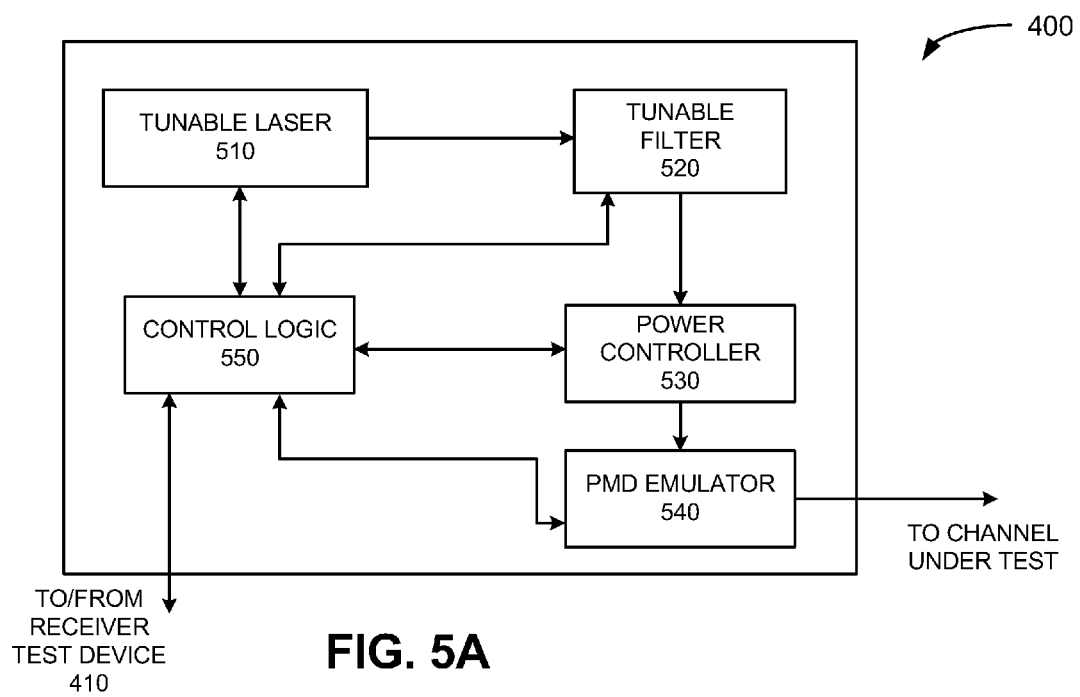
FIG. 5A is a block diagram illustrating an exemplary configuration of the test-transmitting device of FIG. 4.

FIG. 5A illustrates an exemplary configuration of a test device 400 that may be coupled to any node 110 of network 100 for testing an optical path in network 100. Referring to FIG. 5A, test device 400 may include tunable laser 510, a tunable filter 520, power controller 530, a PMD emulator 540, and control logic 550. The configuration illustrated in FIG. 5A is provided for simplicity. In other implementations, more, fewer, or different arrangement of components may be included in test device 400. For example, one or more display devices or user interfaces may be included in test device 400 to allow a network engineer (or other party) to initiate a test on an optical path. In addition, one or more power supplies, or other components may be included in test device 400 to facilitate testing.

Tunable laser 510 may include an erbium doped fiber light source (i.e., laser) that emits a broadband spectrum in the C-band (i.e., wavelengths between 1530 and 1565 nanometers) and/or L band (i.e., wavelengths between 1565 and 1625 nanometers). Tunable laser 510 may also provide an optical signal adequate for high data rate testing, such as 100 Gbps or more.

Tunable laser 510 may be configurable to output light at a particular selected channel wavelength. For example, in an exemplary implementation, tunable laser 510 may support 50 GHz and 100 GHz channel spacing. The tuning range of tunable laser 510 may cover C-band and L-band wavelengths. In addition, the tuning accuracy of tunable laser 510 may be based on the 50 GHz international telecommunications unit (ITU) grid. The values of tunable laser 510 listed above are exemplary only and tunable laser 510 may have other parameters based on the particular circumstances and/or optical path being tested.

In operation, tunable laser 510 may receive a user selection of an available (e.g., unused) channel at initial node 110-1 and may tune light from tunable laser 510 to use that channel. For example, control logic 550 may be configured to receive a test/measurement request from a network administrator and identify an available channel for transmitting a signal. Control logic 550 may initiate tuning of tunable laser 510 and output of a test signal from tunable laser 510.

Tunable filter 520 may be configured to allow adjustment of a pulse width associated with the input signal (e.g., generated by tunable laser 510). Tuning of the pulse width of the generated signal, may allow test device 400 to emulate traffic having varying bit rates and corresponding bit periods. For example, a given bit rate (e.g., 40 Gbps) may have a bit period different than that required to transmit 40 Gigabits of data per second, when overhead information such as Forward Error Correction (FEC) bits and other data are taken into consideration. Given this overhead, bit periods may require adjustment (e.g., narrowing) based on more than a desired final bit rate. Because signals and channels capable of high bit rate traffic have correspondingly narrow bit periods, it is advantageous to be able to tune the pulse width of a signal in a selected channel to mimic a selected bit period. For example, for a 10 Gbps test, a broader pulse width may be set by tunable filter 520, whereas for a 40 Gbps test, a narrower pulse width may be set.

Power controller 530 may include logic to enable the test signal to include a launch power substantially equivalent to DWDM individual channel power in network 100, such that testing results for the test signal may be correlated to results for actual network traffic. In addition, injected signals having significantly more or less power than typical network traffic may undesirably affect traffic on neighboring traffic through ROADMs 110. Depending on the particular ROADMs 110 and number of ROADMs that are part of the optical path being tested, different launch powers may be needed to transmit an optical test signal. In an exemplary implementation, power controller 530 may provide signal power ranging from approximately ±3-4 dBm.

In one implementation, a network engineer or technician may interact with a user interface/input device included on test device 400 (not shown in FIG. 5A) to input the type of ROADMs 110 in the optical path being tested, and test device 400 will automatically provide the proper power level for tunable laser 510. In addition, power controller 530 or tunable laser 510 may ensure that the power of the test signal is maintained at a constant average power level to match with the rest of the DWDM signal power. This may help avoid or minimize automatic gain flattening adjustment that may be performed by various circuits included in ROADMs 110 or elsewhere along the optical path.

In one exemplary implementation, power controller 530 may include an optical boost amplifier (OBA) configured to adjust (e.g., increase or decrease) the gain of an optical signal without optical-electric-optical conversion. Power controller 530 may also include an optical attenuator configured to provide dynamic channel equalization by enabling active attenuation or regulation of optical output power. In other implementations, power controller 530 may not be needed. That is, tunable laser 510 may be configured to provide adequate signal power (and having a constant average power level) regardless of the optical path being tested.

PMD emulator 540 may include logic and components to inject a known amount of simulated PMD into the signal output by power controller 530 (or, optionally, by tunable filter 510 in implementations in which power controller 530 is omitted). In one implementation, PMD emulator 540 may generate first and second order (and higher) PMD having a substantially Maxwell distribution by including multiple variable differential group delay (DGD) elements. For example, PMD emulator 540 may include a multistage system of rotating linear retarders, birefringent crystals, and/or polarization controllers. In operation, the input signal from power controller 530 may be collimated and transmitted through the retarders and crystals. Adjustment of the DGD elements and/or polarization controllers introduces time-varying PMD into the signal. The units of linear differential group delay (DGD) PMD may be picoseconds (ps of delay) and the second order PMD, in such cases, is $ps^2$ (picoseconds squared). The generated PMD may follow a Maxwell distribution for both the first and second order PMD (SOPMD).

Figure 6A:
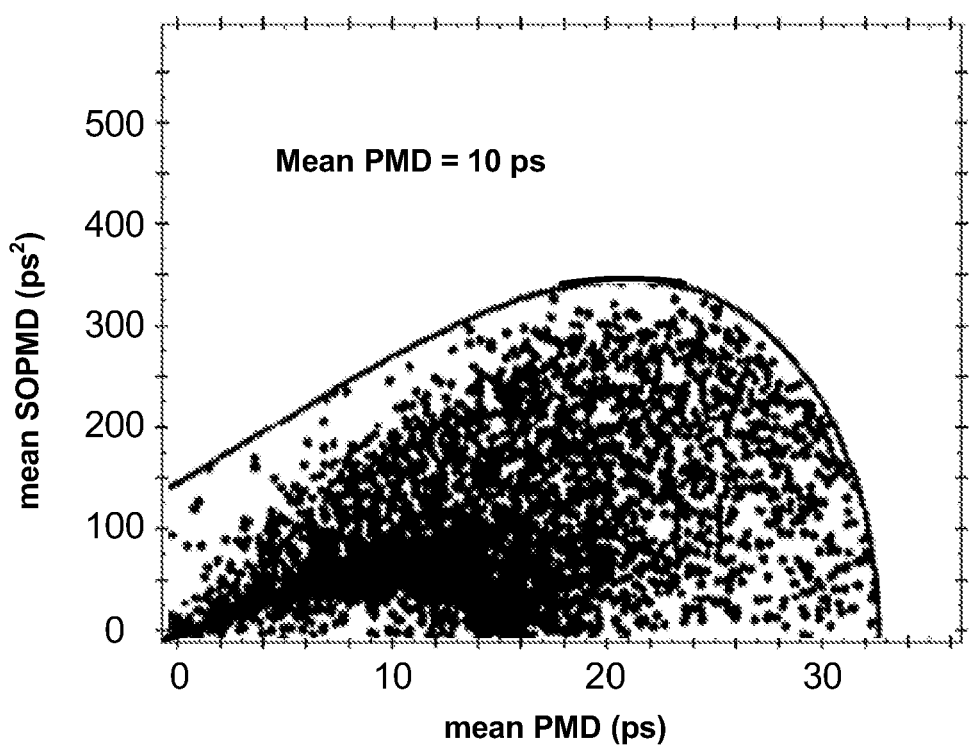
FIG. 6A is a plot of exemplary first order PMD to second order PMD.

An example of this distribution is illustrated in FIG. 6A as a plot of first order PMD (ps) on the x-axis to SOPMD ($ps^2$) on the y-axis. As shown, for a selected mean PMD value (approximately 10 ps in this example), the actual probability density function of first order PMD to SOPMD may fall anywhere within the corresponding Maxwell distribution, as shown by the individual points in FIG. 6. That is, at any particular moment in time, the instantaneous first order PMD value for this example may be anywhere from approximately 0 ps to 33 ps. Similarly, the instantaneous SOPMD value for this example may be anywhere from approximately 0 $ps^2$ to 325 $ps^2$. In a real-world scenario, it may take a period of weeks, months, or, in some cases, even years to observe a full Maxwell distribution of PMD, even where the mean PMD value is known and stable.

As described below, the PMD measurement system described herein allows testing over a range of PMD values with a Maxwell distribution that corresponds to a selected mean PMD value. This allows more accurate testing of the selected channel within the fiber span in a significantly reduced period of time than that required by natural occurrence of the PMD within the span.

Consistent with embodiments briefly described above, PMD emulator 540 may generate PMD at various points within a PMD Maxwell distribution associated with a selected mean PMD value. In one embodiment, points may be selected that include points that have a statistically lower probability of occurrence than those points that would occur naturally. In some implementations, the points may be generated randomly or pseudo-randomly within the distribution, while in other implementations, a user (e.g., via control logic 550) may designate discrete points for testing within a particular Maxwell distribution. In exemplary embodiments, ten, one hundred, or more random or discrete points may be selected for PMD emulator 540.

As described in additional detail below, test-receiving device 410 may use the known value associated with the injected PMD to determine a PMD value associated with the channel and link under test. For example, a total PMD of the test system may be expressed:

$$PMD_{total} = \sqrt{PMD_{emulator}^2 + PMD_{channel}^2},$$

where $PMD_{total}$ is the total mean PMD, $PMD_{emulator}$ is the mean PMD introduced by PMD emulator 540, and $PMD_{channel}$ is the mean PMD introduced by the fiber channel under test. As described below, test-receiving device 410 may include logic and components to determine a value of $PMD_{total}$. Using this value, test device 400 (e.g., control logic 450) and/or test-receiving device 410 may determine a statistically accurate value for $PMD_{channel}$. This may be expressed as:

$$PMD_{channel} = \sqrt{PMD_{total}^2 - PMD_{emulator}^2}$$

Furthermore, to enable increased accuracy in the calculation of the mean PMD associated with the channel under test, the PMD generated by PMD emulator 540 may be perturbed or manipulated rapidly over time, resulting in fluctuations of the total PMD measured by test-receiving device 410. Because, rapid changes in the PMD of the channel under test are not probable, this perturbation of the PMD introduced by PMD emulator 540 increases the statistically apparent contribution of the PMD from PMD emulator 540 to the total measured PMD.

Figure 5B:
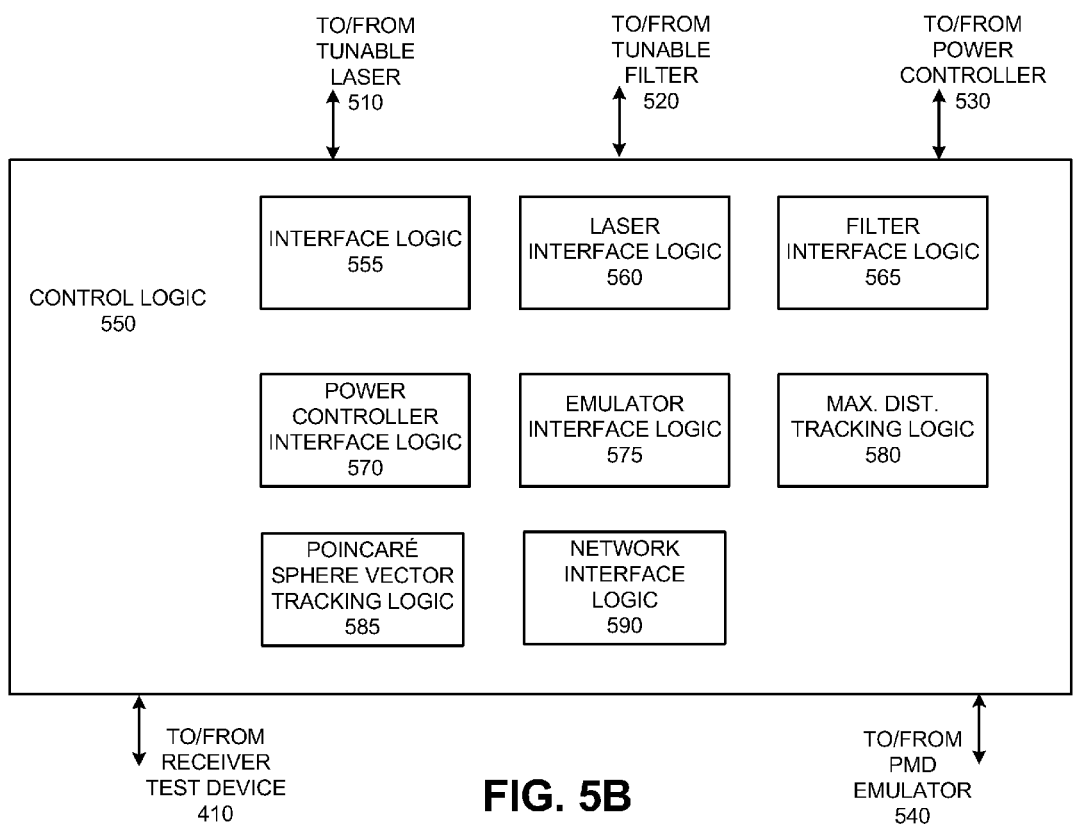
FIG. 5B is a block diagram illustrating an exemplary configuration of the control logic of FIG. 5A.

Control logic 550 may include logic to interact with tunable laser 510, tunable filter 520, power controller 530, PMD emulator 540, and test-receiving device 410. FIG. 5B illustrates exemplary components of control logic 550. As illustrated, control logic 550 may include interface logic 555, laser interface logic 560, filter interface logic 565, power controller interface logic 570, emulator interface logic 575, Maxwell distribution tracking logic 580, Poincaré sphere vector tracking logic 585, and network interface logic 590.

Control logic 550 may include logic for executing a test. For example, interface logic 555 may identify paths/channels that are available for testing (e.g., dark channels) and may provide a listing of available paths/channels to a network administration, e.g., via a display device, or remotely via network communication logic.

Interface logic 555 may be further configured to receive a user selection of a particular path/channel. Laser interface logic 560 may be configured to communicate with tunable laser 510 and tune the output of tunable laser 510 to output a test signal onto the selected path/channel. Filter interface logic 565 may be configured to communicate with tunable filter 520 and adjust the pulse width of the test signal based on settings or configuration information received from the user via interface logic 555. For example, as described above, particular pulse widths may correspond to desired data bit rates/periods, with higher data bit periods having correspondingly narrower pulse widths.

Power controller interface logic 570 may be configured to communicate with power controller 530 and control power adjustments made to the output test signal. Interface logic 555 may be further configured to receive a user selection of a mean PMD value for injecting into the test signal. In one implementation, interface logic 555 may receive user selection of multiple test points with a Maxwell distribution associated with the selected mean PMD value. In other implementations, emulator interface logic 575 may select points randomly within the Maxwell distribution. Regardless of the manner in which the test points are selected, emulator interface logic 575 may be configured to communicate with PMD emulator 540 to inject PMD into the output test signal based on the selected test points.

Maxwell distribution tracking logic 580 may be configured to retrieve and store a value for each PMD test point injected by PMD emulator 540. As described below, this information may be used to calculate a PMD for the channel based on the total PMD measured by test-receiving device 410.

Figure 6B:
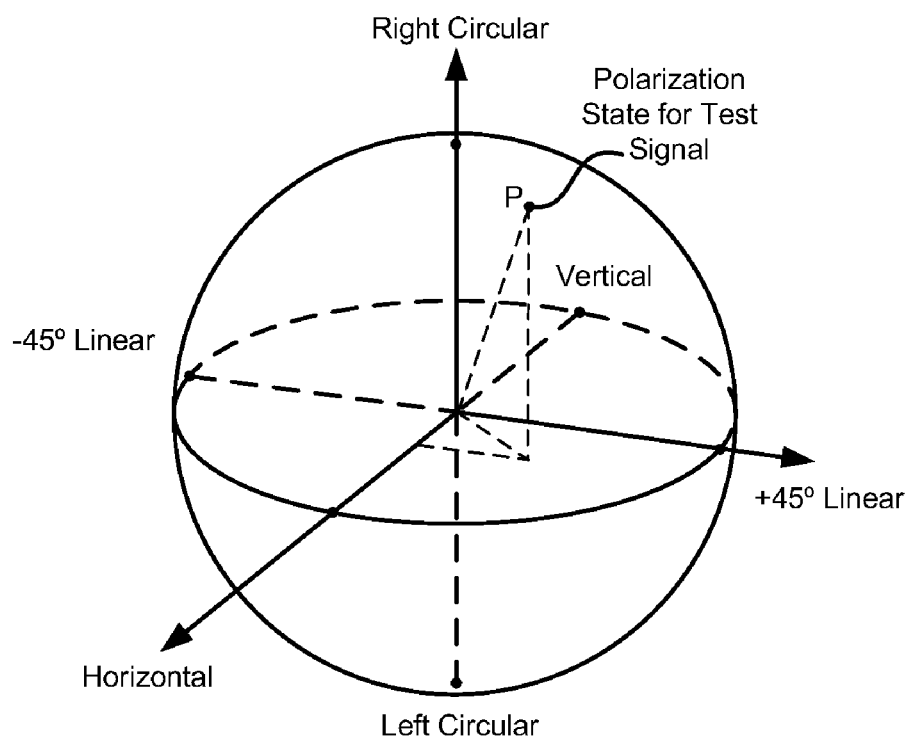
FIG. 6B illustrates an exemplary Poincaré sphere.

In addition to the injected PMD represented by the point in the Maxwell distribution described above the output test signal also includes an output polarization state that effects PMD compensation and measurement by test-receiving device 410. The polarization state of the output test signal is represented as a point on a Poincaré sphere. FIG. 6B illustrates an exemplary Poincaré sphere having a point P corresponding to the injected PMD dependent polarization state associated with the output test signal. The vector between the origin of the sphere and the output polarization state may be defined as the Poincaré sphere vector. At different PMD test points or at other times, different polarization states (e.g., Poincaré sphere vectors) may be observed. For example, for a given injected PMD (e.g., a selected test point in the Maxwell distribution), multiple Poincaré sphere vectors may be observed (e.g., from a northern hemisphere polarization state (right circular) to a southern hemisphere polarization state (left circular)), with each Poincaré sphere vector requiring different amounts and types of compensation.

Poincaré sphere vector tracking logic 585 may be configured to observe and store Poincaré sphere vector information regarding the Poincaré sphere vector corresponding to the output signals. As described below, the Poincaré sphere vector information may be transmitted to test-receiving logic 410 and may be used by compensator/measurement logic 720 to accurately compensate for first and second order (or higher) PMD effects in a received test signal. More specifically, because output polarization may affect PMD compensation, an awareness of the output polarization by compensator/measurement logic 720 may enable more efficient and accurate PMD compensation.

Network interface logic 590 may include an out-of-band communication interface (e.g., an Ethernet interface) for transmitting and/or receiving testing information to/from test-receiving device 410. In some implementations, channel PMD calculation may be performed at test-receiving device 410. In such an implementation, network interface logic 590 may be configured to transmit information regarding the settings for tunable laser 510, tunable filter 520, power controller 530, and/or PMD emulator 540, as well as the Maxwell distribution PMD test point value stored by Maxwell distribution tracking logic 580 and the Poincaré sphere vector information stored by Poincaré sphere vector tracking logic 585. Moreover, control logic 550 may be configured to receive the results of the channel PMD calculation from test-receiving device 410.

In other implementations, channel PMD calculation may be performed at test device 400. In this implementation, control logic 550 may be configured to receive the total PMD value from test-receiving device 410.

As described above, the configuration of test device 400 in FIG. 5 is exemplary only. It should be understood that test device 400 may include more or fewer components than illustrated in FIGS. 5A and 5B. For example, in some exemplary implementations, test device 400 may include one or more communication interfaces for receiving information from a remote device (e.g., test-receiving device 410) and/or providing information to a remote device associated with controlling an optical path test. This may allow all or a portion of an optical path test to be initiated, controlled and/or analyzed remotely with respect to ROADMs 110 in network 100.

Test device 400, as described above, may provide a test signal within a selected channel on one of ROADMs 110. Test-receiving device 410 may receive the test signal for the channel under test from ROADM 110-6 and may analyze the portion of network 100 illustrated in FIG. 4, as described in more detail below.

Figure 7A:
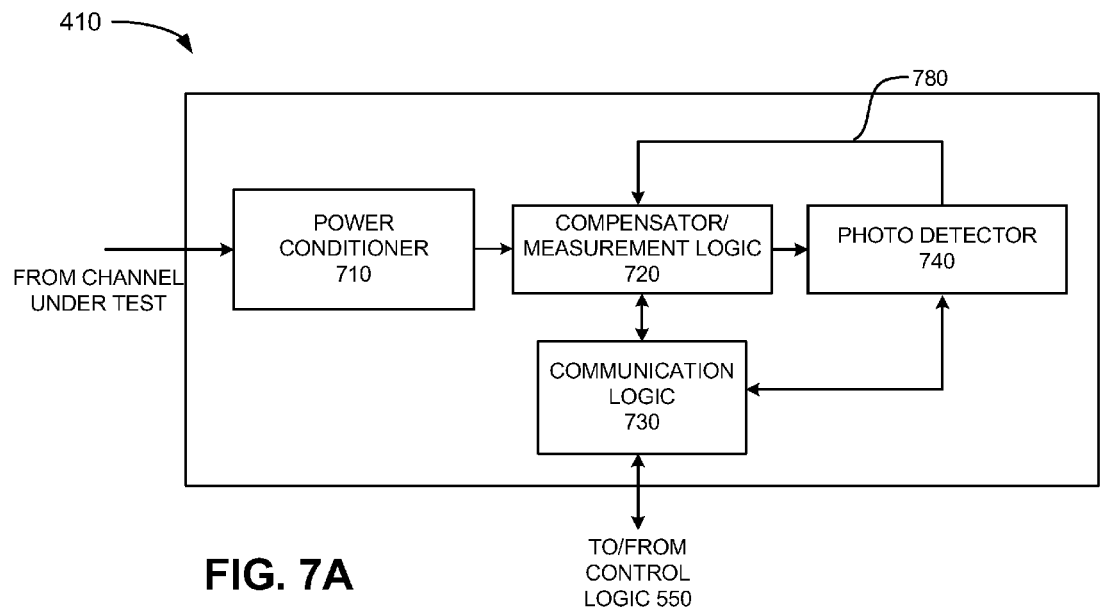
FIG. 7A is a block diagram illustrating an exemplary configuration of the test-receiving device of FIG. 4.

FIG. 7A is an exemplary functional block diagram of components implemented in the test-receiving device 410. Referring to FIG. 7A, test-receiving device 410 may include power conditioner logic 710, PMD compensator/measurement logic 720, communication logic 730, and photo detector 740. The configuration illustrated in FIG. 7A is provided for simplicity.

In other implementations, more or fewer or a different configuration of components may be included in test-receiving device 410. For example, one or more display devices or user interfaces may be included in test-receiving device 410 to allow a network engineer (or other party) to view results of a test on the optical path. In addition, one or more power supplies, or other components may be included in test-receiving device 410 to facilitate testing and analyzing test data.

Power conditioner logic 710 may include logic configured to receive the test optical signal (e.g., from ROADM 110-6) and enhance the power of the received optical signal to a suitable level. For example, power conditioner logic 710 may include a semiconductor optical amplifier (SOA) or doped fiber amplifier configured to recover a signal from an input signal having weak power (semiconductor optical amplifier).

Figure 7B:
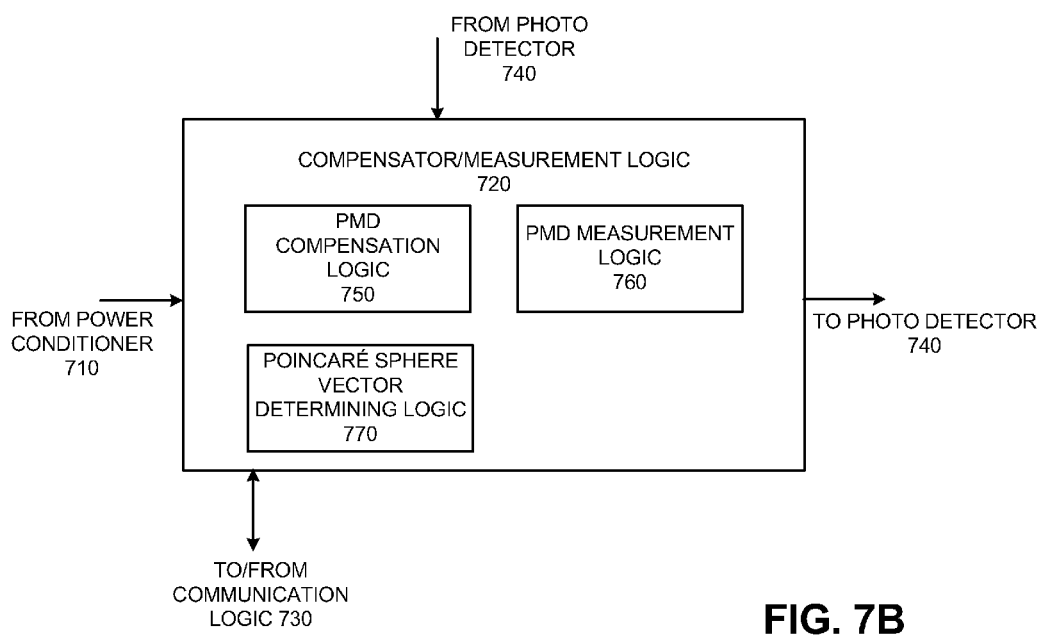
FIG. 7B is a block diagram illustrating an exemplary configuration of the compensator/measurement logic of FIG. 7A.

PMD compensator/measurement logic 720 may include logic to receive the output of power conditioner logic 710 and analyze the output to compensate for effects of PMD. FIG. 7B illustrates exemplary components of PMD compensator/measurement logic 720. As illustrated, PMD compensator/measurement logic 720 may include PMD compensation logic 750, Maxwell distribution determining logic 760, and Poincaré sphere vector determining logic 770.

PMD compensation logic 750 may be configured to identify a value (e.g., $PMD_{total}$) corresponding to the PMD effects associated with the path/channel under test for received signal (e.g., for signals that include varying amounts of injected PMD from PMD emulator 540, described above). PMD compensation logic 720 may compensate for PMD in any suitable manner. Examples of compensation techniques include, but are not limited to, interferometric methods (e.g., an auto-correlation interferometric method), the Jones Matrix Eigenanalysis (JME) method, etc. Following compensation, PMD measurement logic 760 may determine an amount of PMD representing the delay between the two polarization orientations normalized over the length of the path. This value may be represented as a point on the corresponding Maxwell distribution. In some implementations, the PMD compensation includes all orders of PMD (first, second, and all high orders of PMD).

In one exemplary implementation, PMD compensation logic 750 may include logic for separating the horizontal and vertical signals from the received test signal. PMD compensation logic 750 may compare the orthogonal signals (i.e., the horizontal and vertical components or two physical degenerate states) to each other and shift them to put them closer together, using, e.g., multiple optical wave plates. The amount of shift required to optimize the output signal accurately identifies an amount of PMD that was compensated for.

Poincaré sphere vector determining logic 770 may be configured to observe or determine a Poincaré sphere vector corresponding to the received test signal. As described above, the Poincaré sphere vector graphically identifies a polarization state associated with an optical signal. PMD compensation logic 750 may be configured to compare the Poincaré sphere vector observed by Poincaré sphere vector determining logic 770 with a Poincaré sphere vector received from test device 400 (via communication logic 730). If the two vectors different, PMD compensation logic 750 may determine that PMD compensation should be reinitialized for the given test signal, since PMD compensation is dependent on the polarization of the received signal.

PMD compensation logic 750 may also be configured to receive a feedback signal 780 from photo detector 740. Feedback signal 780 may include information relating to the quality of the optical signal received at photo detector 740. The quality information may be used by PMD compensation logic 750 to enable further optimization of the output signal and, accordingly, identification of an accurate PMD measurement by PMD measurement logic 760. In some implementations, feedback signal 780 may include a bit error rate (BER) signal or an optical signal to noise (OSR) ratio signal. PMD compensation logic 750 may use feedback signal 780 to determine whether to perform additional compensation. Once the received value has converged, the total PMD that was compensated for may be identified by PMD measurement logic 760. As described above, this information may be represented as a point in a Maxwell distribution.

In one implementation, PMD compensation logic 720 may compensate for RCE in addition to PMD. In such an implementation, PMD compensation logic 720 may include tunable dispersion compensation logic to receive the test signal from power conditioner 710 and compensate for RCD effects in the received test signal. As described briefly above, RCD refers to a spreading of an optical signal that typically occurs in metro and ultra long haul optical spans. CD compensators (not shown) may be placed at various points (e.g., every 80 or 90 kilometers) in network 100 to reduce the effects of RCD, however, residual CD effects may remain.

According to one implementation, the tunable dispersion compensation logic may be configured to further identify and reduce the effects of the residual CD on the test signal, thereby increasing the accuracy with which PMD compensation logic 720 may subsequently compensate for the effects of PMD on the test signal. For example, for a given test signal, the tunable dispersion compensation logic may identify and compensate for residual CD effects present in the test signal.

Communication logic 730 may include logic to display (e.g., on a display) and/or forward the identified PMD and RCD values, e.g., to other ROADMs 110 or other devices in network 100, or to a control element (not shown) that may maintain a record of PMD values for various channels and paths through network 100. For example, when it is determined that a particular channel in a path through network 100 is not currently used (e.g., is "dark"), test devices 400 and 410 may be configured to, through compensation, identify a mean PMD value corresponding to the path.

Test-receiving device 410 may then be configured, via communication logic 730, to forward the results of the test (e.g., a value for $PMD_{total}$) to, for example, transmitting test device 400. Communication logic 730 may also be configured to output test results on a display or other output device, or to a network administration remote from both test device 400 and test device 410. In other implementations a device (not shown) remote from test devices 400 and 410 may be configured to initiate the test of the dark path through network 100.

Photo detector 740 (also referred to generally as a "receiver") may include any photo detector or other device/circuitry that converts received light into electrical signals. For example, photo detector 740 may receive the output of PMD compensator/measurement logic 720 and convert the optical output into electrical signals. A quality determination may be made in relation to the received test signal and an indication of the quality may be returned to PMD compensator/measurement logic 720 via feedback signal 750. As described above, the quality determination may include a BER determination or an optical SNR determination. Responsive to the receive quality signal, PMD compensator/measurement logic 720 may recursively optimize the test signal and the corresponding PMD measurement. In one implementation, testing is complete upon convergence of the signal quality to an optimized value. For example, if further compensation of the test signal results in a signal having reduced quality, the prior values of the test signal may be considered to be optimized. Alternatively, if continued optimization does not measurably impact the test results, the PMD compensation may be considered to have converged to an accurate value.

Although not explicitly referenced above in relation to FIGS. 1, 2, and 4, in some implementations consistent with embodiments described herein, network 100 may include one or more optical switches configured to switch traffic entirely within the optical domain. For example, an optical switch may be configured to switch traffic from a first channel (e.g., wavelength) to a second channel for a portion of a path in a ULH network. In such implementations, the optical switch may be remotely configured or controlled to switch optical traffic between different channels depending on availability. By using optical switches, multiple channels may be used to form a path through an optical mesh network (e.g., network 100).

In order to accurately identify and compensate for PMD effects in such a switched network, testing devices may be employed adjacent each switch. For example, assume that an optical switch has changed a channel of traffic adjacent node 110-9 in path 1 of FIGS. 2 and 4. In such an implementation, a test-receiving device 410 may be used on the upstream side of the optical switch to identify PMD effects on a first portion of path 1 upstream of the optical switch. A test-transmitting device 400 may be used on the downstream side of the optical switch to initiate testing of a second portion of path 1 downstream of the optical switch.

In one exemplary implementation, various ROADMs 110 within network may include integrated testing equipment (e.g., test devices 400 and 410). ROADMs 110 may be remotely configurable across network 100 to both notify other ROADMs 110 of used and unused channels as well as to responding to test requests. In this manner, testing may be performed when network channels/paths are unused, to provide an identification of the capabilities of the particular channel/path. Testing may be performed at any suitable interval, such as daily, weekly, etc.

In another exemplary implementation, testing may only be performed at edge nodes in network 100. This may allow for the measurement of the PMD effects affecting the entire path and may reduce the testing and reporting requirements of the testing system.

Figure 8:
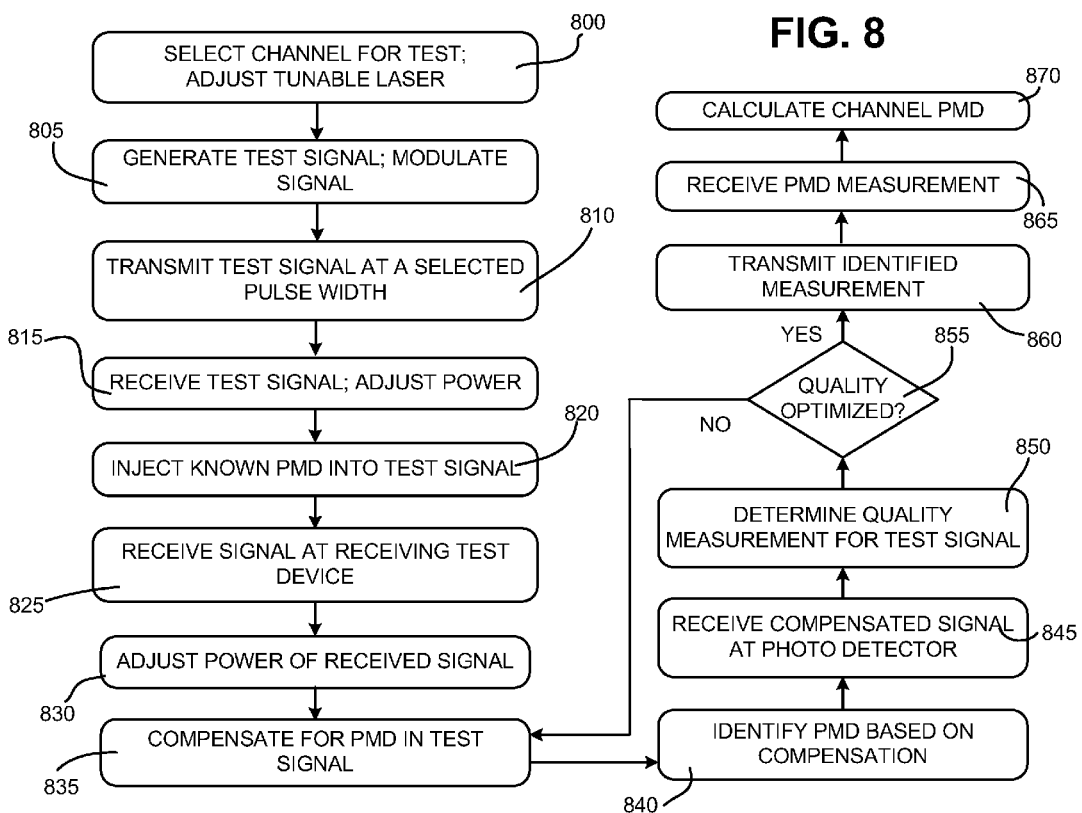
FIG. 8 is a flow diagram illustrating exemplary processing associated with testing the portion of the network shown in FIG. 4.

FIG. 8 is a flow diagram illustrating exemplary processing associated with testing an optical path and determining PMD effects associated with the path. Processing may begin by a network engineer or another party associated with monitoring network 100 identifying an available channel/path to test.

For example, assume that a network engineer would like to test path 1 illustrated in FIGS. 2 and 4, which traverses nodes 110-1, 110-2, 110-9, 110-11 and terminates at node 110-6. As discussed above, traditional PMD testing of path 1 would require that the entire optical path be taken down (i.e., out of service). A PMD measurement would then be made for each span in the path (e.g., each fiber between neighboring nodes) using, e.g., a wavelength scanning technique across all channels in the span. A PMD for a particular path would then be estimated based on an aggregation of the span-based PMD measurements/estimations. As described above, these techniques are unworkable (i.e., they require that the path be out of service) for active fiber spans. Moreover, in the manner described above, accurate PMD measurement may be performed significantly faster than known methods, with accurate testing being performed in hours, rather than days, weeks, or months.

To accomplish high speed, in-service path PMD measurement testing, the network engineer may identify a channel associated with path 1 upon which the test will be run (block 800). For example, the network engineer may identify a channel associated with path 1 which is idle or otherwise unused through ROADMs 110 illustrated in FIG. 4. In one implementation, a large number of channels may exist on each fiber in network 100 (e.g., 80 or more) and one or more channels may be idle throughout the selected path. For example, a C-band/L-band laser may emit optical signals divided into 80 channels ranging from 1525 nm to 1625 nm with a 50 GHz spacing between channels.

As described above, in some implementations, one or more optical switches may be used to transition a path from a first channel to a second channel, with the wavelength remaining consistent across the switch. In such implementation, additional testing devices may be required proximate to the optical switch(es). For the purposes of this example, assume that the network engineer identifies a single available or "dark" channel in the path 1 (block 800). Test device 400 may then be coupled to node 110-1, as illustrated in FIG. 4, and test device 410 may be coupled to node 110-6. Coupling test devices 400 and 410 to the appropriate nodes 110 may be accomplished by one or more network engineers or technicians. Alternatively, testing devices 400 and 410 may be integrated within nodes 110-1 and 110-6, respectively.

The network engineer may then adjust tunable laser 510 to the International Telecommunications Union (ITU) grid of the selected channel (block 800). For example, the selected channel may have a particular associated frequency and tunable laser 510 may be adjusted to that frequency. Tunable laser 510 may generate a test signal (block 805). For example, as discussed above, tunable laser 510 may include an erbium doped fiber light source to inject test signals to the designated channel on path 1. In this implementation, the network engineer may turn on tunable laser 510 to transmit test signals to the appropriate channel at node 110-1. As discussed above, tunable laser 510 may remain on during the testing to ensure that power remains on the channel so that the channel under test is not turned off by one or more of ROADMs 110 or that signals on the optical path are not significantly attenuated once power is no longer detected on the channel.

Tunable laser 510 may be tuned to output the test signal at a selected pulse width (block 810). As described above, in order to mimic high data rate signals, test device 400 may include tunable filter 520 that allows adjustment of the pulse width, with lower bit rate signals having wide pulse widths, and high bit rate signals have narrower pulse widths.

Assume that test device 400 is configured as illustrated in FIG. 5. In this implementation, power controller 430 may adjust the power associated with the test signal to ensure that it is adequate with respect to transmitting the test signal along the desired path (i.e., path 1 in this example) (block 815). As discussed above, the power requirements may be based on the particular type of ROADMs associated with path 1 (e.g., the five ROADMs (nodes 110-1, 110-2, 110-9, 110-11, and 110-6) in path 1). In other implementations, the power level may be pre-set in test device 400 for any number of different ROADMs being tested and the network engineer may simply input, via a user interface on test device 400, the type of devices/ROADMs being tested.

PMD emulator 540 may inject known PMD into the test signal (block 820). For example, as described above, for a selected mean PMD value, various points within a Maxwell distribution associated with the mean PMD value may be selected. By selecting various points within the Maxwell distribution, accurate PMD measurements may be obtained in a short period of time. For each of the selected points, an associated PMD may be injected into the test signal by manipulating or otherwise adjusting the polarization of a number of variable DGD elements. In some implementations, as described above, PMD emulator 540 may perturb or oscillate the injected PMD about a desired value, thereby causing corresponding changes in the total PMD measured by test-receiving device 410. Moreover, in some implementations as described above, control logic 550 may detect and store information regarding the Poincaré sphere vector associated with the output test signal. This information may be transmitted to test-receiving device 410, e.g., via an out-of-band (i.e., non-optical) signal, for use in compensating for PMD in the received signal.

Test-receiving device 410, coupled to the last or terminating node 110 of path 1, will receive at least a portion of the test signal after the signal has passed through nodes 110-1, 110-2, 110-9, 110-11 and 110-6 (block 825). That is, test-receiving device 410 may include a receiver coupled to an optical fiber associated with path 1 that will receive a portion of the originally transmitted test signal that was not clipped or shifted by components in path 1, such as filters or other devices. As discussed above, a number of amplifiers may be located along path 1 to amplify the optical signals transmitted in network 100.

Power conditioner logic 710 may receive the optical test signals received by the terminating node (i.e., node 110-6 in this example) (block 830). Power conditioner logic 710 may adjust the optical power of the received signal to a level consistent with or required by PMD compensator/measurement logic 720 (block 830). For example, as discussed above, in one implementation, power conditioner logic 710 may include an amplifier and/or attenuator.

PMD compensator/measurement logic 720 may receive the test signal and, alternatively, the Maxwell distribution test point of the injected PMD and the output test signal Poincaré sphere vector. PMD compensator/measurement logic 720 may compensate the signal for the total PMD effects observed in the signal (block 835). PMD compensator/measurement logic 720 may, based on the compensation, identify a measurement for total PMD, for each of the mean PMD values injected by PMD emulator 540 (block 840). For example, PMD compensator/measurement logic 720 may be configured to dynamically compensate for PMD effects in the test signal using a feedback signal 750 received from photo detector 540.

Photo detector 740 may receive an optical output from PMD compensator/measurement logic 720 and convert the received optical data from the optical domain into the electrical domain (block 845). For example, photo detector 740 may convert the received optical waveform into corresponding electrical signals that represent the optical waveform output by node 110-6. Photo detector 740 may analyze the electrical signals for parameters such as data loss or other network metrics and determine a quality measurement of the test signal (block 850). For example, as described above, photo detector 740 may determine a BER or optical SNR associated with the test signal. Photo detector 540 may determine whether the quality value has been optimized (block 855). As described above, the quality determination may include a BER determination or an optical SNR determination.

If the quality value has not been optimized (e.g., that the current signal quality is better than the prior signal quality), the quality measurement may be transmitted to PMD compensator/measurement logic 720 (block 855-NO) for use in optimizing the signal quality. If the quality value has been optimized (block 855-YES), communication logic 730 may transmit information relating to the identified PMD measurement to test device 400 (block 860). For example, communication logic 730 may transmit the total calculated mean PMD values to control logic 550 in test device 400, e.g., via an out-of-band (i.e., non-optical) signal.

Control logic 550 may receive the total PMD measurements from test-receiving device 410 (block 865) and calculate a PMD measurement attributable to the channel under test (block 870). For example, control logic 550 may receive a $PMD_{total}$ value from communication logic 730 and may, in combination with the known $PMD_{emulator}$ value, calculate a value for $PMD_{channel}$. As described above, this calculation may be expressed as:

$$PMD_{channel} = \sqrt{PMD_{total}^2 - PMD_{emulator}^2}$$

In the manner described above, PMD measurements associated with a selected channel in an active span of an optical network may be accurately and quickly determined. In addition, in one embodiment, the measurements may be performed without taking any active channels out of service. The PMD measurement may be used to estimate the performance of the selected path through network 100 and also for troubleshooting one or more channels/paths.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations have been described above with respect to using network engineers or technicians to connect various test devices to nodes 110 in network 100. In other implementations, all or some portion of network testing may be initiated and/or analyzed remotely. For example, in an exemplary implementation, test data (e.g., modulated test data) may be injected or transmitted on a particular path remotely from a control center or operations center associated with monitoring network 100. Similarly, test data received at a termination node of an optical path may be forwarded to the control center/operations center for analysis. In such instances, network engineers or technicians may not have to physically go to various nodes to initiate the test or analyze test results.

Further, while embodiments may allow for in-service testing/measuring and compensating, methods and systems described herein may be similarly used in out-of-service network environments. Additionally, while the signal that test device 400 is described as a "test signal" and the process of FIG. 8 is described as a "test," in one embodiment the test signal generated by device 400 may include non-test data being sent from one node to another, such as from node 110-1 to node 110-6. The PMD testing/measurement system described above may be used in a variety of optical network architectures, including optical control plane and generalized multiprotocol label switching (GMPLS) systems.

In addition, in some implementations, various ROADMs that represent initiating and terminating nodes in an optical path may include the test circuitry described above as being included in test device 400 and test device 410, respectively. In such instances, no separate test devices may be needed to perform end-to-end optical path testing.

Further, features have been described above as testing an optical path with a relatively small number of nodes/ROADMs. In other implementations, optical paths with more or less nodes/ROADMs and/or other devices may be analyzed.

In addition, while series of acts have been described with respect to FIG. 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Further, the phrase "based on" is intended to mean "based, at least in part, on" unless explicitly stated otherwise.

What is claimed is:

1. A method, comprising:
   generating a signal at an initiating device;
   identifying a channel in an optical path, wherein the optical path includes at least two spans;
   injecting simulated polarization mode dispersion (PMD) into the signal to generate a test signal;
   transmitting the test signal on the channel;
   receiving the test signal at a destination device;
   compensating for PMD effects in the test signal;
   determining a measurement of PMD for the test signal based on the compensation, the PMD for the test signal including PMD for the channel and the injected PMD; and
   determining a measurement of the PMD for the channel based on the PMD for the test signal and the injected PMD.

2. The method of claim 1, further comprising:
   transmitting the PMD measurement to a network device remote from the destination device.

3. The method of claim 2, wherein the network device comprises the initiating device.

4. The method of claim 1, wherein injecting simulated PMD into the signal further comprises:
   injecting simulated PMD for a number of different PMD values.

5. The method of claim 4, wherein the number of different PMD values comprise PMD values in a Maxwell distribution associated with a mean PMD value.

6. The method of claim 1, further comprising:
   perturbing the simulated PMD about a selected PMD value;
   injecting the perturbed simulated PMD into the test signal; and
   determining the measurement of the PMD for the channel based on the PMD for the test signal and the injected perturbed simulated PMD.

7. The method of claim 1, wherein generating the signal further comprises:
   adjusting a tunable laser at the initiating device based on a wavelength of the identified unused channel upon which the signal is to be transmitted; and
   activating the tunable laser at the initiating device to generate the signal.

8. The method of claim 1, further comprising:
   storing, at the initiating device, a Poincaré sphere vector associated with the test signal;
   transmitting the Poincaré sphere vector to the destination; and
   compensating for PMD effects in the test signal based on the Poincaré sphere vector.

9. The method of claim 1, wherein the initiating device identifies the unused channel from a number of channels that also includes in-service channels.

10. The method of claim 1, wherein generating the signal further comprises:
    adjusting a pulse width of the signal to mimic a signal have a predetermined bit rate.

11. The method of claim 1, wherein determining a measurement of the PMD for the channel, comprises calculating:

$$PMD_{channel} = \sqrt{PMD_{total}^2 - PMD_{emulator}^2},$$

where $PMD_{channel}$ comprises the PMD for the channel, $PMD_{total}$ comprises the total measured PMD, and $PMD_{emulator}$ comprises the injected simulated PMD.

12. The method of claim 1, wherein at least one of the generating, identifying, transmitting, receiving, compensating, or determining is done remotely with respect to the optical path.

13. A device, comprising:
    a tunable signal source configured to emit a signal on an optical fiber at a wavelength associated with an unused channel of the optical fiber;
    a polarization mode dispersion (PMD) emulator configured to inject a known amount of PMD into the signal and forward the signal to a receiver device via the optical fiber;
    a power controller to match a launch power of the signal to a dense wave division multiplexing (DWDM) individual channel power; and
    logic to:
      receive PMD information representative of a total PMD that includes PMD for the channel and the known amount of injected PMD; and
      determine a measurement of PMD for the channel based on the received PMD information and the known amount of injected PMD.

14. The device of claim 13, further comprising:
    communication logic to receive the PMD measurement.

15. The device of claim 13, wherein the PMD emulator is further configured to inject the known amount of PMD for a number of different PMD values.

16. The device of claim 15, wherein the number of different PMD values comprise PMD values in a Maxwell distribution associated with a selected mean PMD value.

17. The device of claim 13, wherein the PMD emulator is further configured to:
    perturb the known amount of PMD about a selected PMD value; and
    inject the perturbed simulated PMD into the signal, wherein the logic is further configured to:
determine the measurement of the PMD for the channel based on the received PMD information and the injected perturbed simulated PMD.

18. A system, comprising:
a first measurement device configured to be coupled to a first node in an optical path being measured, the first measurement device configured to:
generate a signal at an initiating device;
identify an unused channel in an optical path, wherein the optical path includes at least two spans;
inject simulated polarization mode dispersion (PMD) into the signal to generate a test signal; and
transmit the test signal on the unused channel; and
a second measurement device configured to be coupled to a last node in the optical path being measured, the second measurement device configured to:
receive the test signal at a destination device;
compensate for polarization mode dispersion (PMD) effects in the test signal; and
determine a measurement of PMD for the test signal based on the compensation, the PMD for the test signal including PMD for the channel and the injected PMD,
wherein the first measurement device is further configured to determine a measurement of the PMD for the channel based on the PMD for the test signal and the injected PMD.

19. The system of claim 18, wherein the first measurement device is configured to inject the simulated PMD into the signal further comprises:
injecting simulated PMD for a number of different PMD values.

20. The system of claim 18, wherein, when generating the signal at the initiating device, the first measurement device is further configured to:
adjust a pulse width of the signal to mimic a signal have a predetermined bit rate.

* * * * *